United States Patent [19]

Pagnoni

[11] Patent Number: 4,565,481

[45] Date of Patent: Jan. 21, 1986

[54] APPARATUS FOR LOADING AND UNLOADING A DOUBLE OPENING PRESS FOR MANUFACTURING FIBREBOARD

[75] Inventor: Giorgio Pagnoni, Monza, Italy

[73] Assignee: F.LLI Pagnoni S.p.A., Italy

[21] Appl. No.: 611,408

[22] Filed: May 17, 1984

Related U.S. Application Data

[63] Continuation-in-part of Ser. No. 341,253, Jan. 21, 1982, abandoned.

[30] Foreign Application Priority Data

May 21, 1981 [IT] Italy .............................. 21914 A/81

[51] Int. Cl.⁴ .......................... B29J 5/08; B65G 65/02

[52] U.S. Cl. .................................... 414/285; 100/196; 198/447; 198/631; 425/338; 425/406

[58] Field of Search ........................ 414/222, 267, 285; 100/196, 207; 425/338, 383, 406; 198/592, 631, 447

[56] References Cited

U.S. PATENT DOCUMENTS

| | | | |
|---|---|---|---|
| 3,824,508 | 7/1974 | Axer et al. | 425/338 |
| 3,860,381 | 1/1975 | Pesch | 425/338 |
| 4,042,125 | 8/1977 | Falkinger et al. | 100/196 X |
| 4,062,458 | 12/1977 | Manini et al. | 414/285 X |
| 4,350,484 | 9/1982 | Seeger et al. | 425/338 X |

FOREIGN PATENT DOCUMENTS

| | | | |
|---|---|---|---|
| 2421086 | 11/1975 | Fed. Rep. of Germany | 100/196 |

*Primary Examiner*—Joseph E. Valenza
*Assistant Examiner*—David A. Bucci
*Attorney, Agent, or Firm*—McGlew and Tuttle

[57] ABSTRACT

An apparatus for loading and unloading a multiopening press for manufacturing fibreboard comprises a first endless conveyor movable through an upper opening of a press having upper and lower openings with an intermediate plate therebetween. The first endless conveyor is formed of a plurality of conveyor sections which are spaced along the first conveyor and connected together by at least one drive member. A second endless conveyor is movable through the lower opening of the press. The first and second conveyors move along first and second feed paths through the upper and lower opening of the press respectively. The first conveyor however intersects the second feed path with the at least one drive member positioned on the first conveyor to permit passage of a mat for making a fibreboard on the second feed path to the second conveyor when each of the conveyor sections is spaced away from a location of intersection of the first conveyor and the second feed path. A pivoting table is pivotally mounted upstream of the first and second feed paths with an end movable to intersect the first and second feed paths.

4 Claims, 4 Drawing Figures

APPARATUS FOR LOADING AND UNLOADING A DOUBLE OPENING PRESS FOR MANUFACTURING FIBREBOARD

This is a continuation-in-part of application Ser. No. 06/341,253, filed Jan. 21, 1982, now abandoned.

FIELD AND BACKGROUND OF THE INVENTION

The present invention relates, in general, to fibreboard manufacturing presses, and in particular to a new and useful device for loading such presses for manufacturing boards.

Multi-opening presses for manufacturing wood fibreboards or the like are already known. These presses comprise several openings that are simultaneously fed by means of different systems. In all cases, the presses are provided with multi-deck loading-lifts.

These systems must be fed deck-by-deck with the product to be pressed during the pressing phase and subsequently introduced in the press in order to be able to deposit the material to be pressed during their return travel. Such a procedure entails relatively long dead times.

On the other hand, single opening presses are already known which are provided with a belt conveyor which is simultaneously capable of loading a mat to be pressed into a board at one side and of unloading the pressed board at the other side. This conveyor belt remains in the press during the curing phase and therefore permits overlapping loading and unloading times, but its output is modest as is typical of single opening presses.

SUMMARY OF THE INVENTION

The present invention provides an apparatus which includes the advantages of both prior art solutions, but which avoids their limitations.

The apparatus of the present invention permits simultaneous feeding of two openings of a double opening press, using rapid and simple means such as those used for the single opening presses, without resorting to loading lifts or other similar means.

According to the invention, an ideal apparatus for achieving this aim is one which comprises distinct means for feeding the lower opening and the upper opening of a press. The means for feeding the lower opening consists of two conveyor belt modules or sections linked with two spaced side driving chains. These chains are motor driven and each one forms a closed ring or loop around the lower part of the press structure.

The means for feeding the upper opening preferably consists of six conveyor belt modules or sections linked with two "motorized" side driving chains similar to the above-mentioned chains, each one forming a closed ring or loop but in this case passing through the upper press opening, then around upper and lowertables, upper and lower unloading tables, and the bottom structure of the press.

Upstream of the press loading tables a further "pivoting" table is provided which is hinged at one end and movable in the vertical direction at the other end. This permits alternate feeding of the two upper and lower loading tables.

The upper loading and unloading tables are hinged at their two ends, at one end to a fixed support structure, and at the other end directly to a movable intermediate plate of the press. Hence, the upper tables follow the movements of the movable plate of the press and therefore are able to feed the mats or boards also when the press openings are reduced in height when thin boards are to be produced. Lastly, known means are provided downstream of the unloading tables for alternate extraction of the finished boards from the tables.

The method of operating the inventive apparatus includes utilizing the upstream pivoting table to supply mats alternately to the upper and to the lower loading tables. From the upper and lower loading tables, mats can be fed respectively into the upper and lower opening of the double opening press. The press is then closed to cure the map and form fibrebords. After the press is opened, the nowcured boards in the upper and lower openings are fed respectively to upper and lower unloading tables. A downstream or second "pivoting" table can be utilized to alternately cured boards from the upper and lower unloading tables.

Accordingly, an object of the present invention is to provide an apparatus for loading and unloading a double opening press for manufacturing wood fibreboard or the like which, as already known, are made of a mass of fibres which have poor mutual cohesion prior to the pressing operation.

This apparatus is novel in that it comprises distinct means for feeding or rather loading and unloading the lower opening and the upper opening of the press, and such means both comprise conveyor belt modules linked with closed loop and motorized side driving chains.

The apparatus is also novel in that the means for loading and unloading the lower opening run around the upper part of the press structure, and the means for loading and unloading the upper opening run around the tables at upstream and downstream sides of the press, as well as around the bottom structure of the press.

Thirdly, the apparatus is novel in that the loading and unloading means for the upper opening of the press are hinged at the end furthest from said press to fixed supports and are likewise hinged at the other end to the intermediate plate. The press itself is the same or similar to the presses of copending patent applications Ser. Nos. 341,165 and 341,252, both filed Jan. 21, 1982 by the applicants. These two applications which have since matured respectively into U.S. Pat. Nos. 4,383,814 and 4,441,877, are incorporated here by reference to show details of the double opening press. With the loading and unloading means of the invention pivotally mounted to the intermediate plate of the press, the loading and unloading means are movable and are capable of feeding the openings even when the openings are small in height where thin boards are to be produced.

Fourthly, the apparatus is novel in that it is provided at an upstream side with a special "pivoting" table which is hinged at one end and is pivotable upwardly and downwardly at the other end. Hence, it is able to alternatively feed the two loading tables of the press.

The sequence of operation of said apparatus is summed up as follows, which is also novel in itself:

First of all, it should be emphasized that the modular conveyor belts cannot be actuated when the press is closed, while the endless belts of the loading and unloading tables of the lower press opening are, instead free to run.

Having stated this, the phases in the process are as follows:

PHASE (1) CURING OF THE BOARDS—Mats are cured into boards by pressing them in the upper and lower opening of the press. In a phase immediately before opening of the press, five mats to be pressed or cured are located on the modular conveyor belts. Two boards are in the press, one mat is on each loading table and one board is on the upper unloading table. The board of the unloading table had been submitted to curing in a preceding pressing phase.

PHASE (2) WITH THE PRESS OPEN—After curing the two boards in the press, the two chain driving systems are run inside the upper and lower openings of the press, simultaneously, hence:

(a) The two mats to be cured from the loading tables enter the press:
(b) The two cured boards from the press are transferred from the press to the unloading tables;
(c) The cured boards of the preceding pressing phase which was laying on the upper unloading table, immediately downstream of the press, is transferred to the second pivoting table which acts in an extraction zone for the cured boards: and
(d) A mat laying on the "pivoting" table upsteam of the loading tables and press is transferred onto the upper loading table.

PHASE (3) CLOSING OF THE PRESS—This starts the curing cycle to transform a mat into a board.

PHASE (4) The following movements of the mats and boards are performed during the curing cycle, PHASE(1), and in harmony with the rhythm of mat preparation for pressing and board finishing after curing:

(a) The first or upstream "pivoting" table is lowered and a mat is transferred onto the loading table; and
(b) The lower unloading table transfers the previously cured board to the extraction zone.

For an understanding of the principles of the invention, reference is made to the following description of a typical embodiment thereof as illustrated in the accompanying drawings.

DESCRIPTION OF THE PREFERRED EMBODIMENT

Figure 1:
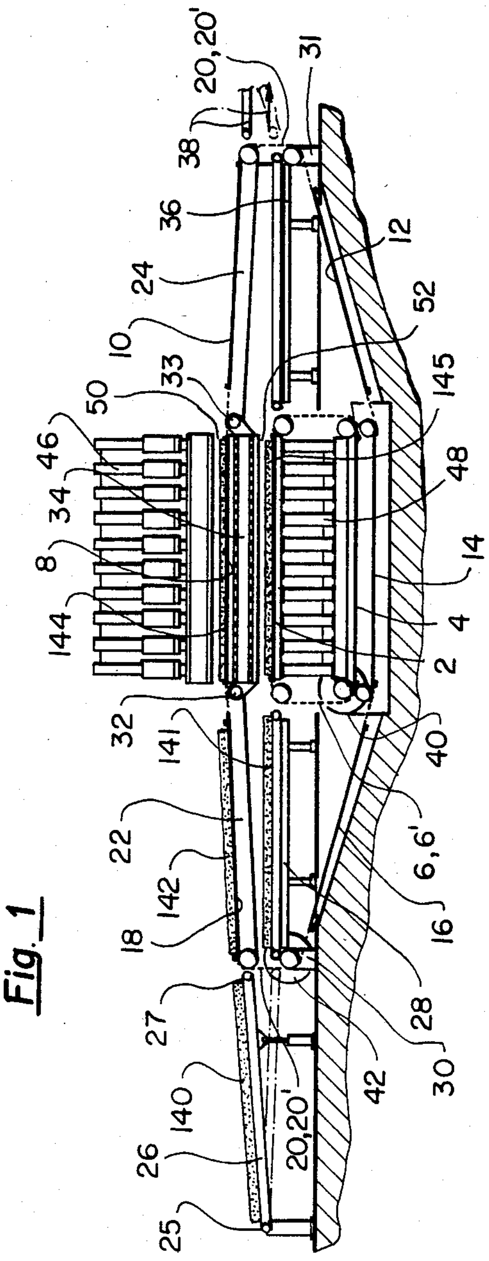
FIG. 1 is a side elevational view of the overall apparatus in accordance with the invention.

As can be seen in FIG. 1, the apparatus for loading and unloading a double opening press comprises, from left to right (for a person viewing the drawing), a "pivoting" table 26 hinged at one end 25 and having the other end 27 free to move in a vertical direction. This table serves for the alternate feeding of either an upper (22) or a lower (28) loading table of the press, with mats. Similar upper and lower unloading tables, 24 and 36 respectively, are provided at the press outlet. The unloading tables feed the already known means of extraction at 38, only partly visible in the figure. Means 38 may also be a pivoting table.

The drawing shows the press to have an upper part 46, with the lower part of its structure at 48. An upper opening 50 and a lower opening 52 are defined between the upper and lower parts by a movable intermediate plate 34.

The characteristic features of the double opening press are disclosed by the applicant in the mentioned U.S. Pat. Nos. 4,383,814 and 4,441,877.

Figure 1A:
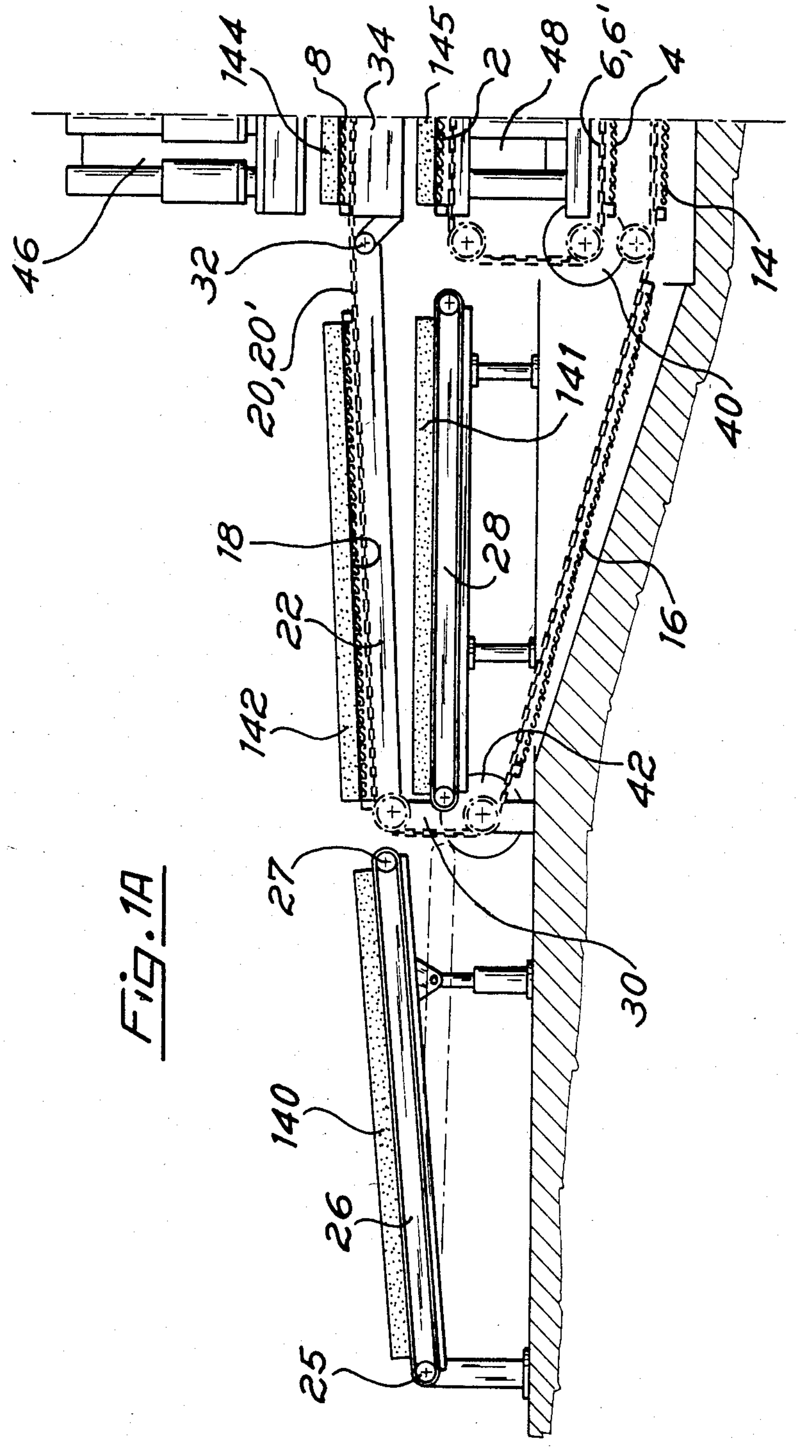
FIG. 1A is an enlarged side elevational view showing the loading side or upstream side of the press.
Figure 1B:
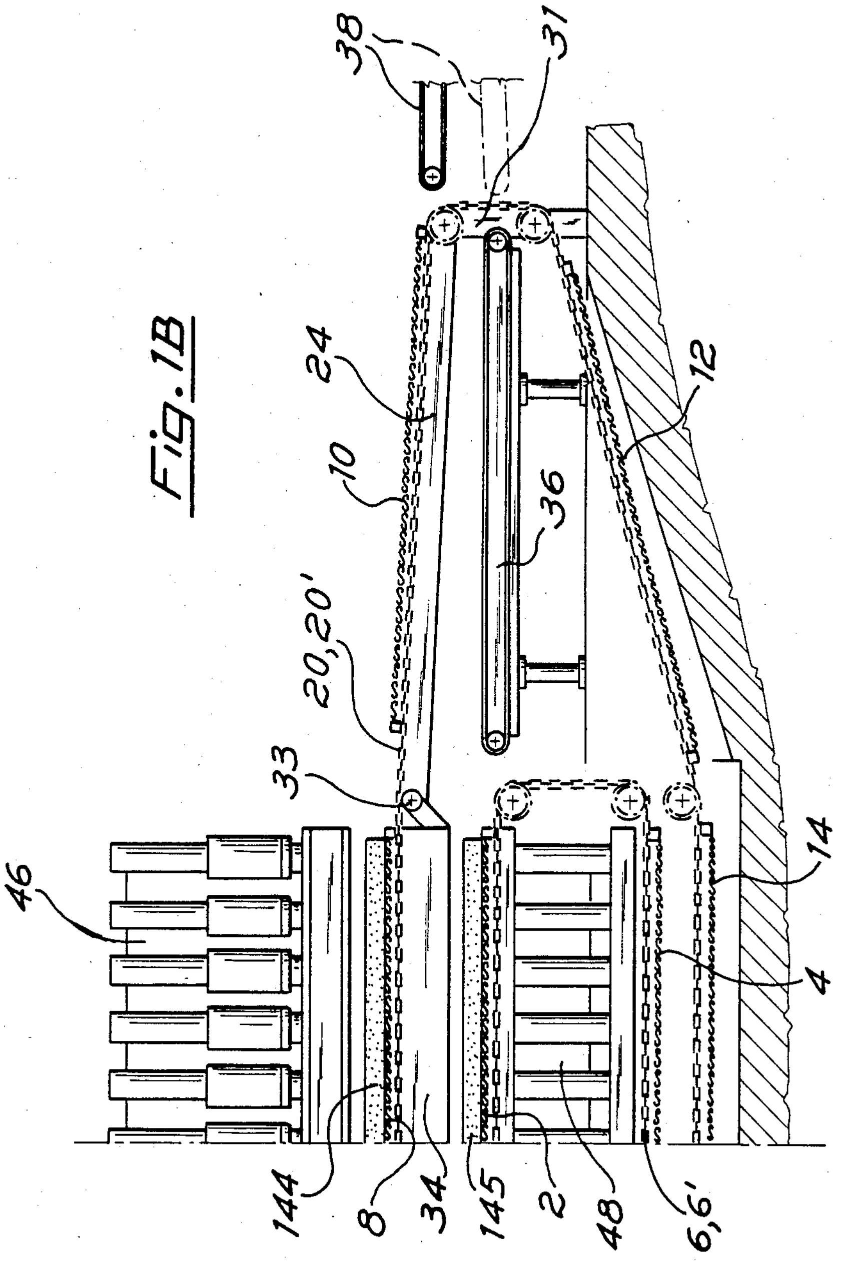
FIG. 1B is a view similar to FIG. 1B showing the unloading or downstream side of the press.

As shown in FIG. 1A, the upper loading table 22 is hinged at one end by hinge 32, to the movable intermediate plate 34 thereby permitting it to be raised and lowered. FIG. 1B shows unloading table 24 to be hinged to the other end of plate 34 at 33. The other end of table 22 is connected to a first bearing support 30. This feature permits, as already stated, feeding of thin mats into the press when press openings 50, 52 are small in height. Table 24 has an opposite end connected to a second hearing support 31.

Figure 2:
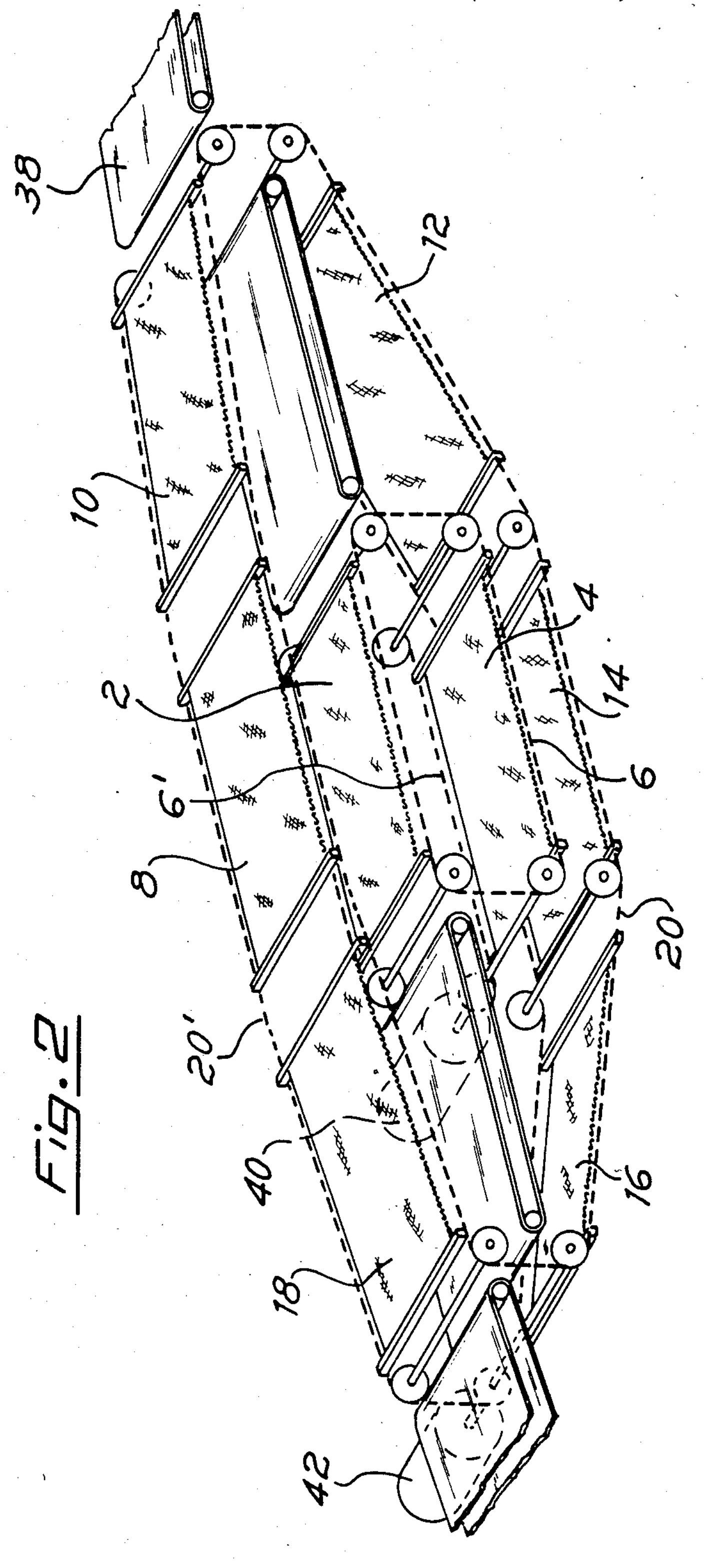
FIG. 2 is a partial schematic perspective view of the apparatus shown in FIG. 1 with press deleted for clarity.

The loading and unloading apparatus in accordance with the invention is essentially novel in that it comprises distinct upper and lower means for feeding openings 50 and 52 respectively. More particularly, and as best shown in FIG. 2, two conveyor belt modules or sections 2, 4 are connected to two spaced side driving chains or members 6, 6' which are movable or motorized by motor 40. Chains 6 and 6' form closed loops passing through the lower opening 52 (FIG. 1) and the lower part 48 of the press structure. This forms a second conveyor. Other similar conveyor belt modules, preferably six in number at 8, 10, 12, 14, 16, 18, are likewise linked in turn to another two spaced side driving chains 20, 20' which are likewise movable by motor 42, and form closed loops passing through the upper opening, as well as around loading tables 22, 28 and unloading tables 24, 36 of press upper part 46 and the lower press structure 48. Modules 8, 10, 12, 14, 16, with chains 20, 20' form a first coveyor. The operation of the apparatus is as described in the summary section of this specification. Mats to be cured into boards can thus be conveyed onto lower loading table 28 and board can be conveyed onto lower unloading table 36, between the chains 20, 20' of the first conveyor for the upper tables. To permits boards or mats to be conveyed between chains 20 and 20', the distance between the chains 20, 20', as shown in FIG. 2, is greater than the width of board or mat to be process in the apparatus.

A first feed path through the upper opening 50 is thus defined by the series of mats 140 on table 26, 142, on table 22 and 144 on plate 34. A board (not shown) fed from table 24 completes the series. A second feed path through the lower opening 52 is defined by the series of mats 141 on table 28 and 145 on lower press structure 48. A board (not shown) fed from table 36 completes this series. Mats 140, 141 and 142 are not yet pressed and mats 144 and 145 have just been pressed into boards in FIGS. 1, 1A and 1B.

The form "fibreboard" in this application is meant to include boards made of particles and/or fibres. It is noted that the first conveyor intersects the second feed path so that mats or boards on the second feed path are fed between the driving chains 20, 20' at a first intersection at support 30 and at a second intersection at support 31.

It is further noted that each conveyor module or section, whether sections 2 or 4 of the second conveyor or sections 8, 10, 12, 14, 16, or 18 of the second conveyor, are narrower than the space between their driving chains (6, 6' or 20,20') and are connected to the chains by cross-beams which are clearly visible in FIG. 2.

It is further noted that as disclosed in the previous patents to the applicant identified above, pressing can be achieved by moving a plate connected to the upper pressed part 46 downwardly to close space 50. At the same time, intermediate movable plate 34 also moves downwardly, along with the downwardly moving plate of upper part 46, to close the lower opening 52. The plate of the lower press structure 48 is not moved.

While a specific embodiment of the invention has been shown and described in detail to illustrate the application of the principles of the invention, it will be understood that the invention may be embodied otherwise without departing from such principles.

What is claimed is:

1. An apparatus for loading and unloading a multi-opening press for manufacturing fibreboard, the press having a lower part (48), an upper part (46) and an intermediate part (34) between the upper and lower parts defining upper and lower openings, comprising:
   - a first bearing support (30);
   - a second bearing support (31) spaced from said first bearing support;
   - a first endless conveyor movable through the upper opening (50) in a first feed path from said first bearing support to said second bearing support, said first endless conveyor movable in said first feed path in a feed direction, and formed of a plurality of conveyor sections (8, 10, 12, 14, 16, 18) spaced along said first conveyor and two spaced drive members (20,20') connecting said plurality of conveyor sections together and spaced sufficiently to permit passage of the fibreboard to be processed by the upper and the intermediate parts of the press, said first endless conveyor extending under the lower part (48) of the press;
   - a second endless conveyor movable through the lower opening (52) and in a second feed path, said first conveyor intersecting said second feed path at a pair of spaced locations of intersection, each location of intersection adjacent one of said bearing supports so that a board on said second feed path can move between said two spaced drive members (20,20') and two adjacent ones of said plurality of conveyor sections of said first endless conveyor:
   - an upper loading table (22) upstream of the upper opening (50) on said feed path and in said feed direction, pivotally mounted at one end thereof (32) to the intermediate plate (34) and at an opposite end therof to said first bearing support (30); and
   - an upper unloading table (24) downstream of the upper opening (5) on said first feed half and in said feed direction, pivotally mounted at one end (33) thereof to the intermediate plate (34) and at an opposite end thereof to said second bearing support (31).

2. An apparatus according to claim 1, wherein said second endless conveyor comprises a plurality of conveyor sections (2,4) connected to a pair of spaced drive members (6,6'), said conveyor sections being spaced from each other on said second endless conveyor.

3. An apparatus according to claim 1, wherein said second endless conveyor extends under the lower part (48) of the press, said apparatus including a lower loading table (28) disposed below said upper loading table (22) and positioned upstream of the lower opening (52) and on said second feed path, and a lower unloading table (36) disposed below said upper unloading table (24) and positioned downstream of the lower opening (52) on said second feed path, said first endless conveyor extending around said upper and lower loading tables and around said upper and lower unloading tables.

4. An apparatus according to claim 3, including a pivoting table (26) pivotally mounted at a location upstream of said first and second feedpaths and upstream of said upper and lower loading tables, said pivoting table having an end (27) vertically movable to intersect said first and second feed paths.

* * * * *